Nov. 26, 1935.   E. E. WEMP   2,021,973
CLUTCH
Original Filed Aug. 10, 1934   3 Sheets-Sheet 1

INVENTOR.
Ernest E. Wemp
BY
Barnes, Kisselle, Laughlin & Raisch
ATTORNEYS.

Nov. 26, 1935. E. E. WEMP 2,021,973
CLUTCH
Original Filed Aug. 10, 1934  3 Sheets-Sheet 2
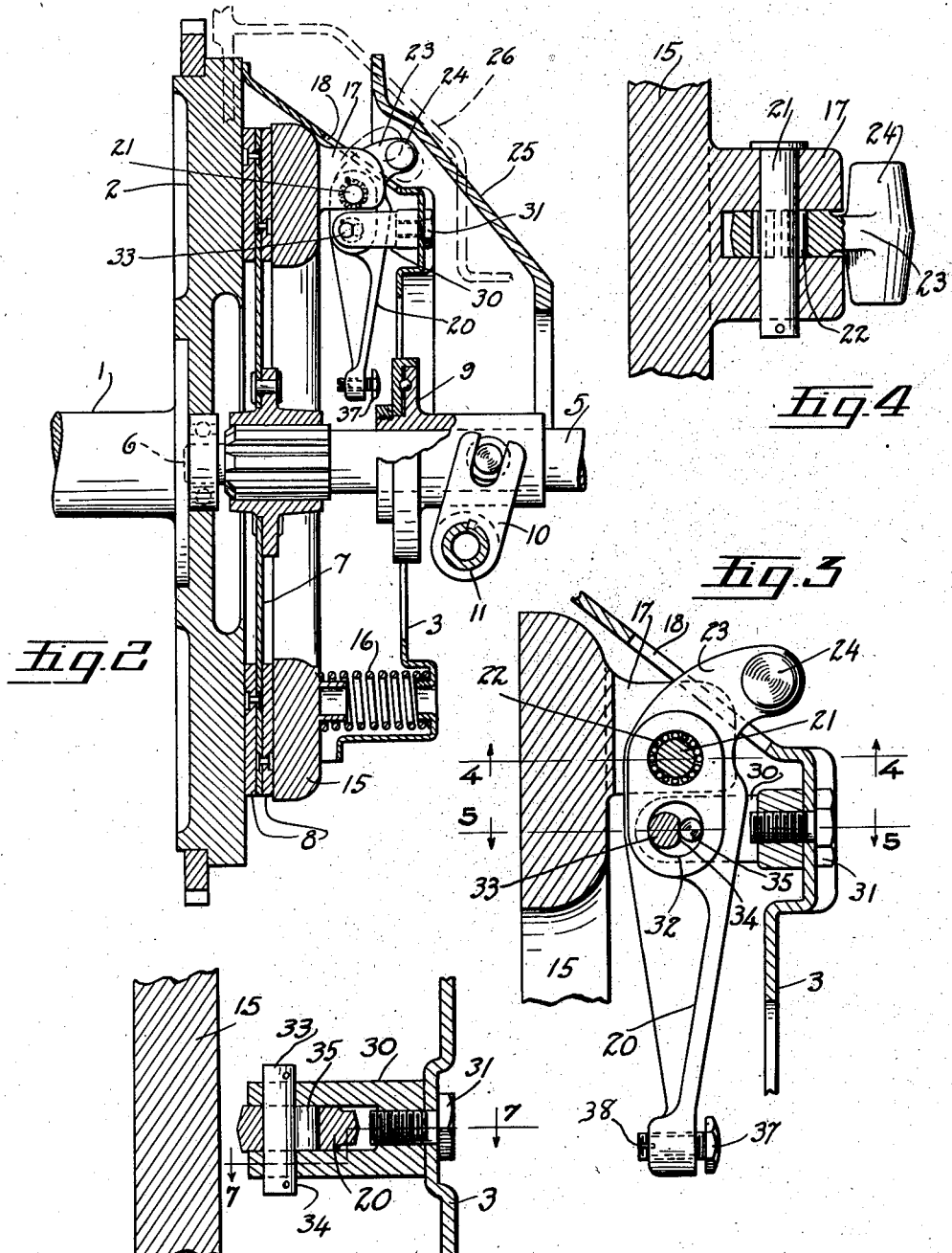
INVENTOR.
Ernest E. Wemp
BY
Barnes, Kisselle, Laughlin & Raisch
ATTORNEYS.

Nov. 26, 1935.  E. E. WEMP  2,021,973

CLUTCH

Original Filed Aug. 10, 1934   3 Sheets-Sheet 3

INVENTOR.
Ernest E. Wemp
BY
Barnes, Kisselle, Laughlin & Raisch
ATTORNEYS.

Patented Nov. 26, 1935

2,021,973

UNITED STATES PATENT OFFICE 2,021,973

CLUTCH

Ernest E. Wemp, Detroit, Mich.

Continuation of application Serial No. 739,241, August 10, 1934. This application August 2, 1935, Serial No. 34,358

20 Claims. (Cl. 192—103)

This invention relates to a clutch and has to do particularly with a clutch useful in automotive vehicles and with internal combustion engines. This application is a continuation of application Serial No. 739,241 filed August 10, 1934.

The objects of the invention are several and principal among the objects is the provision of a clutch with a nicety of action, one which is easy to operate in that the pressure or force required to release the clutch at relatively low speeds where clutch operation is usually practiced, is low without requiring clutch releasing movement of long range, and yet the clutch provides ample torque capacity. To this end the clutch of the present invention includes one or more clutch packing springs, the structure of which may be similar to the structure generally used in clutches at the present time and wherein the clutch packing pressure is augmented by unbalanced centrifugal force.

Accordingly, the clutch incorporates one or more springs for effecting clutch engagement, and centrifugally actuated means, such as weights, arranged so that the centrifugal force is translated into pressure for increasing the pressure with which the clutch is engaged over that provided by the springs. It will be noted that the spring pressure is substantially constant, at least within a relatively small range caused by such items as wear of the facings with resultant extension of the springs, and the fact that the springs may take a "set" after usage. The spring pressure, however, is referred to herein as being substantially constant with due regard to these variables. The pressure afforded by the centrifugal force varies with variation in the R. P. M.

Now, one object of the invention is to provide a satisfactory clutch wherein the spring pressure is held to a minimum, to thus minimize the force required to be exerted by an operator in releasing the clutch with the usual clutch releasing pedal at the relatively low speeds where clutch operation is usually practiced, and at the same time to hold the pressure provided by the centrifugal weights at a minimum, so that even at high speeds the clutch may still be released without requiring undue force on the part of the operator. There are two sources of energy which transmit torque to the clutch which come in for consideration with the present invention; one is the torque of the engine, and the other is kinetic energy stored up in the rotating parts. I have discovered what is believed to be the correct principle in the design and construction of a clutch which is packed into engagement by springs and centrifugal force. This principle is that of matching or proportioning the spring pressure to the maximum torque of the engine, both of which are substantially constant and calculating the force exerted by centrifugal action so that the same is proportioned to the kinetic energy of the rotating parts, both the centrifugal force and kinetic energy being variable, to the end that the total packing pressure gives to the clutch a torque capacity sufficient to meet the requirements in any given installation. The maximum torque curve in a well designed internal combustion engine is fairly flat from about 1000 R. P. M. to 2500 R. P. M. (See Fig. 11). The spring pressure which is matched or proportioned to the maximum engine torque, preferably is slightly in excess of that required to handle the maximum engine torque in order to take care of certain variables. For instance, the springs gradually become extended as the clutch facings wear, and other variables may occur in the engine, in the clutch, or both; for example, the coefficient of friction of the clutch facings may vary if they become glazed. Also, slight variations may occur in the springs, either in their initial condition or after use. There may be other variables such as the varying friction between the relatively movable parts of the clutch, such as the friction at the sliding contact between driving members as one of the driving members shifts to release or engage the clutch.

To obtain maximum results of this invention, the excess pressure provided by the springs should be held as low as possible. An excess spring pressure of about 10% is a preferable amount; although this may be varied. If the excess is less than 10%, the results of the invention will be obtained, but the safety factor is impaired. If the excess spring pressure is increased over 10%, the resulting reduction of pedal pressure at idling speeds will not be so favorable. Further increase of spring pressure will result in less favorable pedal pressure, to the point where the spring pressure has been increased so that the springs alone will afford all of the packing pressure required, and the decrease in pedal pressure, which is one of the objects of the invention, will be entirely nullified.

It is a further object of the invention to provide a clutch of such a structure and design that it may be used with engines of present design without requiring changes to be made in the so-called bell housing or clutch housing of the engine. It is more or less conventional at the present time to house the clutch in a bell housing secured to or forming a part of the engine, and the clearances between the housing and the clutch parts are small. The present invention provides a clutch with centrifugal elements so arranged that they require only a small space, and the clutch can be installed in the bell housings of engines heretofore used with other conventional clutches without requiring any change in the bell housing structure or size.

With the view of furthering the ease of operation of the clutch, the clutch structure embodies anti-friction swivel connections. This quite appreciably reduces the work required of an operator in releasing the clutch and minimizes the wear of parts and eliminates scrubbing or rubbing action. To this end a particular construction is employed in some of the swivel connections which will be dealt with later on in the detailed description.

A still further object of the invention is the provision of a clutch structure wherein the outward centrifugal force of the unbalanced masses or weights, and/or other parts, is resisted by one of the relatively heavy driving clutch members, to the end that the usual cover plate or other support upon which these masses or parts are carried is relieved of this outward force, and accordingly need not be made of exceptionally heavy stock or material. By this arrangement the cost of the clutch is minimized and the weight of the clutch cover plate or other support is not increased over that in the conventional spring clutch.

Fig. 2 is a vertical sectional view taken through a clutch constructed in accordance with the invention.

Fig. 3 is an enlarged detailed view showing a lever and lever mounting.

Fig. 4 is a sectional view taken on line 4—4 of Fig. 3.

Fig. 5 is a sectional view taken on line 5—5 of Fig. 3.

Figure 9:
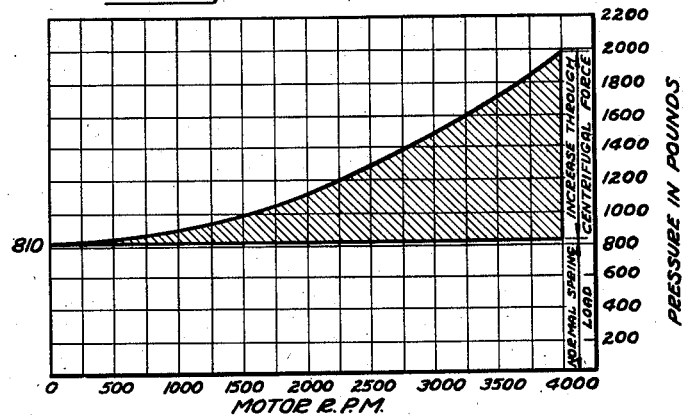

Fig. 9 is a view showing the pressure curve of centrifugal weights and spring pressure, and showing the total packing pressure at various R. P. M.

Figure 10:
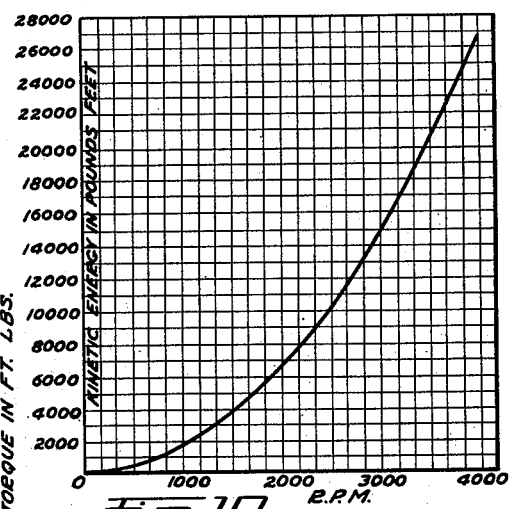

Fig. 10 is a view showing the kinetic energy graph of the crank-shaft system of an internal combustion engine.

Figure 11:
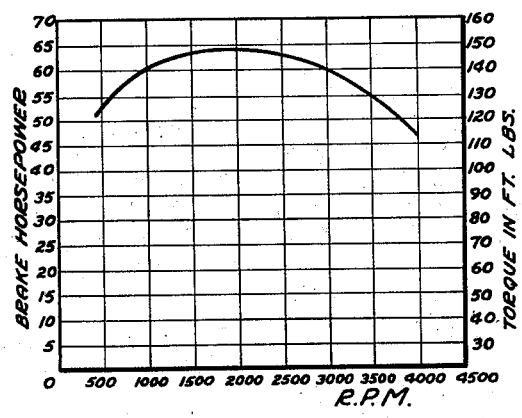

Fig. 11 is a view illustrating the torque curve of an internal combustion engine.

The clutch may be associated with the usual fly-wheel of an internal combustion engine, the crank-shaft of such an engine being illustrated at 1 and the fly-wheel at 2. A cover plate for the clutch is shown at 3 arranged to be bolted to the fly-wheel by means of cap screws or the like taken through apertures 4 and fitted into the fly-wheel. A driven shaft is shown at 5, one end of which may be piloted in the fly-wheel as at 6, and upon the driven shaft is mounted a clutch driven disc 7 having facing material 8 to be packed between the fly-wheel and a clutch pressure plate. A clutch throw-out bearing is illustrated at 9, the same being reciprocally mounted upon the shaft 5 arranged to be shifted to the left as Fig. 2 is viewed by means of a yoke 10 mounted upon a clutch operating shaft 11 and which is to be rocked by a clutch lever actuated by the foot of the operator in the usual manner. The lever is not shown.

Figure 1:
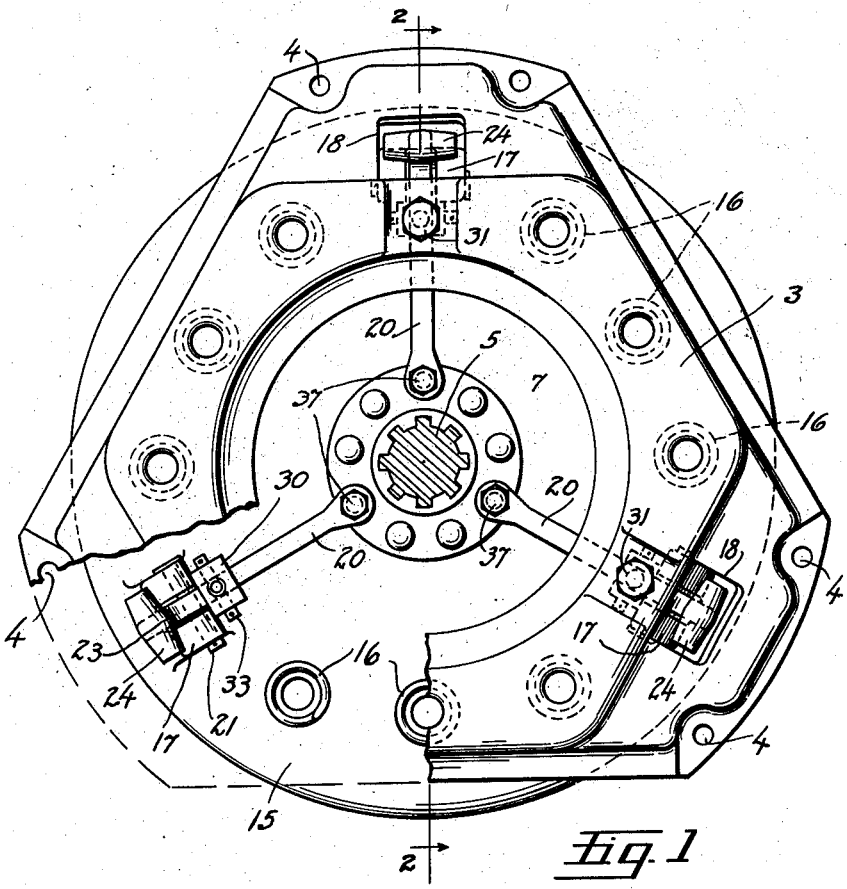
Fig. 1 is a rear elevational view of a larger size (nine springs) clutch constructed in accordance with the invention with parts cut away illustrating underlying structure.
Figure 7:
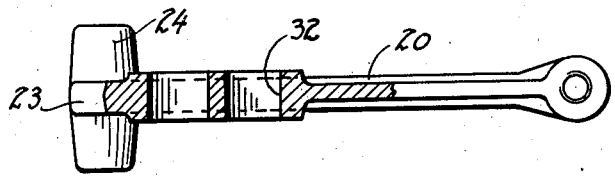
Fig. 7 is a sectional view taken on line 7—7 of Fig. 5.
Figure 6:
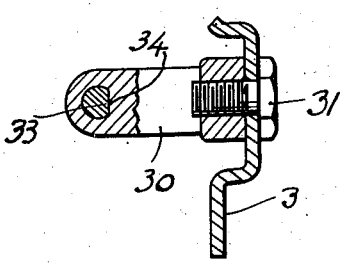
Fig. 6 is a detailed view partly in section showing a lever structure.
Figure 8:
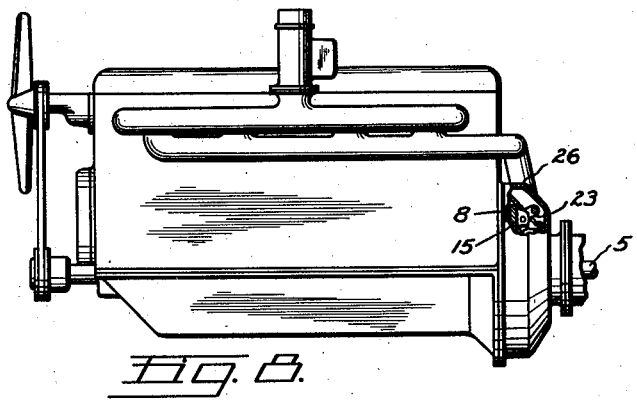
Fig. 8 is a general view showing an internal combustion engine and clutch housing.

The structure, thus far described, may be of any conventional design. And this structure is shown merely for the purpose of providing a showing with which to associate the novel clutch structure. The cover plate, as perhaps best illustrated in Fig. 1, is of a special design but this, however, is claimed in the application Serial No. 739,517. It is to be pointed out that the cover plate formation or structure may vary insofar as the present invention is concerned.

A clutch pressure plate is illustrated at 15, and a number of clutch packing springs 16 are, in the structure herein, disposed between the clutch pressure plate and the cover plate for packing the pressure plate against the driven disc with the driven disc held packed between the pressure plate and the fly-wheel. The pressure plate, of course, is a driving member and it may be driven by bosses 17 which may be integral with the pressure plate and which slidably fit in apertures 18 in the cover plate. In the present form of the invention, there may be three of such bosses on the pressure plate and a corresponding number of apertures in the cover plate as shown in Fig. 1. The bosses 17 may be of bifurcated formation and a clutch releasing lever may be mounted between the portions of each boss. Such a lever is shown at 20, of which there may be three in number. Each lever may be connected to the pressure plate as shown in Fig. 4 wherein a pin 21 serves to mount the lever pivotally and the pivotal mounting preferably includes an anti-friction bearing structure and thus may employ needle type rollers 22. Each lever is provided with an unbalanced centrifugal weight and to this end each lever may have a part 23 extending out through the adjacent slot 18 in the cover plate.

The inner ends of the levers are preferably fairly well balanced centrifugally at initial installation. It will be understood, however, that as the facings wear and become thinner the levers gradually shift in a counter-clockwise direction, as Fig. 2 is viewed, in clutch engaged position. The inner ends are arranged so that when they are unbalanced centrifugally by this shift, the centrifugal force is translated into clutch packing pressure. Thus, any loss of clutch packing pressure by the outer weighted end of the levers due to the shift, may be substantially overcome by the increasing pressure afforded by the inner ends of the levers.

These parts 23 extend outwardly and rearwardly of the pivotal mounting of the lever to provide the unbalanced centrifugal weight arrangement and may terminate in enlarged head portions 24. In Fig. 2 there is shown two types of clutch housings illustrative of the engines of two automobiles of present design with which the clutch may be used. One housing is illustrated at 25 in full lines and the other at 26 in dotted lines. Obviously the clutch must clear the housing as it is a rotating part whereas the housing is stationary. The particular formation and location of the parts 23 and 24 of the levers are such as to clear these housings. These housings are shown to illustrate the close clearances which must be reckoned with.

The levers are fulcrumed on the cover plate. A structure for thus mounting the levers may take the form of a bifurcated bracket 30, and as shown herein each lever is provided with a relatively large aperture 32. A pin 33 may extend through the aperture and the pin is securely held by the bifurcated arms of the bracket 30. This pin 33 has a flat side 34 and a roller 35 is positioned in the aperture 32 and arranged to contact with and roll upon the flat surface 34. The inner end of each lever is adapted to be contacted by the throw out bearing 9 so that the levers may be rocked clockwise as Fig. 2 is viewed as the throw out bearing 9 is shifted to the left, the levers rocking upon the fulcrum point supported by the brackets 30, thus shifting the pressure plate away from the fly-wheel to release the driven disc. Screw thread adjusting members 37, one for each lever may be associated with the inner end of each lever so that in the assembly of the clutch, a proper clearance adjustment may be maintained with respect to the throw out bearing 9 and to bring the contact surfaces into a common plane. After adjustment some of the metal of each lever may be peened over with a sharp instrument into the slot 38 in the end of each screw.

The construction, it will be noted, is such that the outward centrifugal force of the levers and their masses 24 is taken by the pressure plate 15 through the pins 21. The pressure plate is a relatively heavy strong member and is capable of resisting this outward centrifugal force. This relieves the fulcrums carried by the cover plate. Otherwise, if the outward centrifugal force is resisted by the fulcrums, the yokes would act as cantilevers and the cover plate would have to be strengthened or made of heavier stock which would obviously increase the cost and weight of the assembly. By carrying the outward centrifugal force on the pressure plate, the cover plate structure need not substantially vary as to strength from cover plates of conventional use.

It will at once be appreciated that inasmuch as the pressure plate is of solid construction, the pivotal connection as at 21 must shift axially on a straight line. This would clash with the arcuate movement of the portion of the lever at this point if the lever was on a fixed fulcrum point. In order to compensate for this, the fulcrum bearing structure embodying the flat-sided pin 33 and roller 35 is provided. The pin 33 and roller 35 fit somewhat loosely in the aperture 32. In other words, the diameter of the aperture 32 is slightly greater in length than the diameter of the roller 35 plus the dimension of the pin 33 measured diametrically from the flat face thereof to the opposite side of the pin 33. This structure, it will be observed constitutes a floating anti-friction fulcrum which permits the levers to shift bodily as they rock. If the levers are rocked to release the clutch the rollers 35 are under compression but they have a rolling action on the flat sides of the pins 33, and with respect to the walls of the apertures in the levers. This is advantageous from several standpoints: it makes for ease of operation; it eliminates sliding or rubbing action as the levers shift bodily, thus minimizing wear on the parts. After the clutch has been engaged by the springs, there is no further substantial movement of the levers, since the centrifugal masses merely increase the effective clutch packing pressure without any appreciable pivotal action. Theoretically there may be some pivotal action due to the compression of the facings on the driven disc or other parts, but this is infinitesimal. Accordingly, when force is communicated to the pin 33 by the unbalanced centrifugal masses, there is no appreciable lever movement and no rubbing between the pin 33 and the wall of the apertures in the levers.

This fulcrum structure, arranged to permit shift bodily of the levers, results in the antifriction rollers 35 being relatively loosely pocketed, and the structure is admirably adapted for use in a rotating mechanism. When the clutch is engaged and rotating, the levers press against the pins 33 so that the rollers 35 are loose, and the centrifugal force urges them into their outermost position. In this position they have their maximum rolling action inwardly on the flat surfaces of the pins 33. When the clutch is released by a shift of the clutch throw-out bearing 9 the rollers 35 are under compression and they roll radially inwardly on the flat surfaces of the pins. Thus the looseness or clearance in this floating bearing structure is minimized since the rollers come into play at the extreme outer position and are thus in position to roll inwardly to the fullest extent. The following example is given as to this fulcrum bearing which is incorporated in a clutch structure now in use, although it is to be appreciated that the movements given in this example may vary: In this particular clutch the looseness of the fulcrums provided a total of about $\frac{1}{16}$ of an inch radial bodily shift of the levers, and about $\frac{1}{32}$ of an inch maximum roll of the rollers 35 on the flat faces of the pins.

Since the fulcrum and load pivot are required to resist forces in opposite directions, as when the levers are rocked to release the clutch and when the centrifugal weights function to increase the packing pressure, they are termed herein as being of closed swivel connection type. These connections are so described in some of the claims appended hereto. This term "closed" is intended to cover a structure where the fulcrum and pivot will take a thrust in opposite directions and to differentiate from a structure where, for example, a lever has merely a contact on one side acting as a fulcrum or load point and which will function only when a force on the lever is in one direction and will not function when the force is in the opposite direction.

The general operation is as follows: The clutch is released and engaged in the usual manner by the shift of the throw out bearing. At idling speeds of the engine there is very little centrifugal force so that in the operation of the clutch very little centrifugal force has to be overcome, and due to the reduced spring pressure the operation is easy. The clutch, however, if engaged only by the spring pressure will preferably transmit maximum engine torque, and at higher speeds the centrifugal force provides enough pressure to take care of kinetic energy.

To further make clear the results obtained by this invention the following examples may be given: A conventional spring packed clutch designed for use with a certain automobile built commercially today has a total packing pressure of 1380 lbs. Obviously, this force has to be overcome by the operator in releasing the clutch. A clutch designed in accordance with the present invention and for use in the same automobile has a total clutch packing spring pressure of about 950 lbs. The additional pressure required at higher speeds where kinetic energy manifests itself is provided by centrifugal force. In general it has been found that the clutch pedal pressure may be reduced about 25% to 35% with the same leverage ratio. In another example of a clutch which has gone into commercial use, the spring pressure was reduced from about 1200 lbs. to about 810 lbs. The effect of this was to reduce the pedal pressure by more than 25% at idling speeds. This example is illustrated in Fig. 9. In both of these examples, the spring pressure was such as to provide a torque capacity in the clutch which was about 10% in excess of that required to transmit maximum engine torque. This excess is calculated for a new clutch and is called upon as the clutch wears and as other variables are encountered. In these clutches the total clutch packing pressure at high speeds exceeds the spring pressure of the clutch which was replaced. In the first example, the pressure at 4000 R. P. M. was just about double the 950 lbs. of the springs, as against 1380 lbs. in the replaced clutch; in the second example (Fig. 9), the total clutch packing pressure at 4000 R. P. M. was about the same as the first example, or in the vicinity of 1900 lbs., as against about 1200 lbs. in the replaced clutch. Accordingly, the pressure at high speeds exceeds the replaced spring clutch and at low speeds is less than the replaced spring clutch. This arrangement of the centrifugal force is provided in order to proportion the force in such a way as to properly absorb the kinetic energy, as will appear below.

As the R. P. M. increases the kinetic energy builds up with the square of the R. P. M., and also the centrifugal force builds up with the square of the R. P. M. See Figs. 9 and 10. The kinetic energy, of course, varies in different engines, depending upon the speeds at which the engine will operate and the weight in the crankshaft system, which includes the fly-wheel, clutch driving parts and other rotating driving parts, as well also as the diameter of the fly-wheel, or the distance from the center of rotation of the rotating parts. One phase of the invention is to properly balance or proportion the centrifugal force to the kinetic energy of the engine with which the clutch is to be used. A satisfactory manner of balancing or proportioning the centrifugal weights to the kinetic energy is that of subjecting the clutch to certain tests which, by experience, are known, and if a clutch meets these tests, it will be satisfactory for use. For example, certain stalling tests may be used, to-wit: If a clutch stalls the engine with which it is to be used in .5 second at 1000 R. P. M. or in 2 seconds at 4000 R. P. M., such a clutch is acceptable and considered to meet the requirements. With the maximum torque of the engine known, the strength of the springs can be calculated so that the clutch torque capacity afforded by the springs is substantially just sufficient to transmit maximum engine torque plus an excess to take care of variables. The centrifugal action may then be ascertained by the above mentioned stalling tests. The centrifugally actuated means are arranged to give to the clutch the work absorbing ability to meet the tests. To this extent, therefore, the centrifugal force is matched or proportioned to the kinetic energy and this is what is meant in this specification and claims when the statement is made that the centrifugal force or weights are matched or proportioned to kinetic energy. Of course, other tests or ways of determining the fitness of the clutch and determining the centrifugal force may be resorted to, the above tests being given as one example of tests which may be used for this purpose. Also, the invention is not limited to a clutch designed to meet these tests as the invention may be incorporated in a clutch capable of meeting more severe tests or a clutch which will only stand less severe tests. It is not desirable that more centrifugal force be present than is necessary, since this would increase the pedal pressure at moderate speeds, as well also as higher speeds, and would provide an unnecessarily high torque capacity. Accordingly, the centrifugal force is preferably held to a minimum which is just enough to give the clutch the requirements for use with a particular engine.

Work is done upon the driving parts by the engine when the engine is accelerating. This energy is stored in these rotating parts as long as the ratio of the load and the engine torque remains the same and this kinetic energy plays no part in driving the car, but when the load increases with respect to the engine torque, then this kinetic energy is discharged in part or in whole in doing work on the driven parts. This is, of course, one of the purposes of the fly-wheel. The fly-wheel and the other rotating parts build up kinetic energy in accordance with the square of the speed and likewise the centrifugal weights build up a centrifugal force which varies in accordance with the square of the speed of rotation.

The kinetic energy manifests itself, particularly, under extreme conditions and conditions bordering on the extreme; as for example, where a vehicle is about stuck in a hole or mud or soft earth, and it is necessary to race the engine and throw in the clutch to give the vehicle sudden impulse designed to get it free from its position. Moreover, the coefficient of friction of the facings decreases at high slipping speeds. When a clutch is being engaged with the engine racing it is of course a slipping engagement and the coefficient of friction has dropped off under such conditions. In undertaking a fast getaway, in second gear for example, there is also a high speed slippage which results in the dropping off of the coefficient of friction. From this standpoint it will be appreciated that the ability, of the ordinary spring clutch heretofore used, to absorb energy decreased upon increase of R. P. M. and upon increase of the energy to be absorbed. The present clutch has the characteristics of an increasing torque capacity with increasing R. P. M., or in other words the ability to absorb energy increases as the energy to be absorbed increases.

The clutch, of course, is desirable for use in all vehicles. But it is perhaps particularly desirable in the more expensive fine cars where ease of operation is an emphasized point. However, such cars are usually large and employ powerful engines and have heretofore required strong clutch packing springs which had to be overcome to release the clutch. In such large cars it has been the practice to use clutches having more than one driven disc to increase the torque capacity, but due to the building up of centrifugal force in the present clutch a single disc clutch may be employed in such cars where the present invention is utilized.

Moreover, the invention provides a clutch of simple, rugged construction utilizing a minimum number of parts, and the clutch is in fact cheaper than the old spring clutch which it replaces. The number of clutch packing springs may be reduced. The smaller size clutch of the present invention now uses six packing springs, whereas the similar old conventional spring clutch which was replaced employed twelve packing springs.

Anti-rattle springs acting upon the levers may be dispensed with inasmuch as during normal operation of the vehicle, the centrifugal force holds the levers tightly at the pivotal connections, thus eliminating a tendency to rattle.

It is not to be understood that a 10% excess of spring pressure is absolutely essential for, as stated above, this may be varied up or down. A 10% excess is believed to be the optimum, but, obviously, somewhat impaired results or nearly as good results may be obtained by slight variations. The point is to substantially match the spring pressure with the engine torque and substantially match the centrifugal force with the kinetic energy. If an attempt is made to get along with spring pressure somewhat less than I have specified, this may be compensated for by increasing the centrifugal weights but in my judgment will not get as good results, but still may be within the spirit and teachings of my invention.

I claim:

1. In combination with an engine having a maximum torque output, a clutch comprising ritary driving and driven members, clutch packing spring means having a strength to pack the members together to provide clutch engagement having substantially only sufficient torque capacity to take care of said maximum engine torque plus expected variables, operator actuated means for releasing the clutch against the action of the springs, and centrifugal weight means for increasing the clutch packing pressure upon rotation of the clutch to increase the torque capacity of the clutch as the kinetic energy of the engine and the rotary driving members of the clutch builds up incident to rotation.

2. In combination with an engine having a maximum torque output, a clutch comprising rotary driving and driven members, clutch packing spring means having a strength to pack the members together to provide clutch engagement with substantially just sufficient torque capacity to take care of said maximum engine torque plus variables, operator actuated means for releasing the clutch against the action of the springs, and centrifugal weight means for increasing the clutch packing pressure upon increase of the R. P. M., the increasing clutch packing pressure by the centrifugal weight means being calculated to take care of the building up kinetic energy of the engine and the rotary driving members of the clutch as the R. P. M. increases.

3. In combination with an engine having a maximum torque output, a clutch comprising, driving and driven members, spring means for packing the clutch members together having a strength proportioned relative to the torque of the engine, whereby the clutch, when engaged by the spring means, has a torque capacity which exceeds that required to transmit said maximum torque of the engine substantially only enough to take care of variables, and insufficient to transmit the maximum torque of the engine plus any substantial kinetic energy, and centrifugally actuated means for increasing the clutch packing pressure over that provided by the spring means upon rotation of the clutch, whereby the torque capacity of the clutch is increased upon rotation to take care of the kinetic energy of the engine and the rotating driving clutch members.

4. In combination with an engine having a maximum torque output, a clutch comprising, driving and driven members, spring means for packing the clutch members together having a strength proportioned relative to the torque of the engine, whereby the clutch, when engaged by the spring means, has a torque capacity which exceeds that required to transmit said maximum torque of the engine substantially only enough to take care of expected variables, and insufficient to transmit the maximum torque of the engine plus the kinetic energy of the engine and the rotating clutch driving members, and centrifugally actuated means for increasing the clutch packing pressure over that provided by the spring means upon rotation of the clutch, the effective increase in the clutch packing pressure by the centrifugally actuated means being calculated so that the torque capacity of the clutch at any given R. P. M. is substantially just sufficient to efficiently transmit the maximum torque of the engine plus the torque of kinetic energy.

5. The combination with an engine developing a given engine torque and having therein and connected therewith rotating driving parts developing kinetic energy, of a clutch comprising rotary driving and driven members, springs for packing said members together, said springs arranged to give a pressure approximately such as is just sufficient to transmit the engine torque without kinetic energy to the driven parts, means for releasing the driving and driven members, and centrifugal weights for developing and applying to the driving and driven members additional pressure as the engine speeds up, said pressure increase being in step with the development of kinetic energy of the engine and rotating clutch driving members and together with the springs being approximately sufficient and without substantial excess, under customary requirements, to transmit the total turning effort of engine and connected driving parts including the kinetic energy.

6. The combination with an engine developing a given engine torque and having therein and connected therewith rotating driving parts developing kinetic energy, of a clutch comprising rotary driving and driven members, springs for packing said members together, said springs arranged to give a pressure approximately such as is just sufficient to transmit to the driven parts the engine torque plus a slight margin to allow for expected variables, means for developing and applying to the driving and driven members additional pressure as the engine speeds up, the total pressure increasing in step with the development of kinetic energy of the rotating driving parts and driving clutch members and being approximately just sufficient, under customary requirements, to transmit the total turning effort of engine and connected driving parts including the kinetic energy.

7. The combination with an engine having rotating driving parts of a clutch having driving and driven members, spring means for packing the clutch members together having a strength proportioned relative to the torque of said engine to engage the clutch with a torque capacity which is substantially 10% in excess of the torque capacity required to transmit the maximum torque of the engine, and insufficient to transmit the maximum torque of the engine plus any substantial torque of the kinetic energy of the rotating driving parts, and centrifugally actuated means calculated to increase the clutch packing pressure over that provided by the spring means upon rotation of the clutch substantially enough and without material excess to transmit the torque of kinetic energy under customary requirements.

8. In combination with an engine having a maximum torque output, a clutch comprising, driving and driven members, spring means for packing the clutch members together having a strength proportioned relative to the torque of the engine to engage the clutch with a torque capacity which is substantially 10% in excess of the torque capacity required to transmit said maximum torque of the engine, and insufficient to transmit said maximum torque of the engine plus any substantial torque of the kinetic energy of the engine and rotary driving members of the clutch, and centrifugally actuated means for increasing the clutch packing pressure over that provided by the spring means upon rotation of the clutch to increase the torque capacity of the clutch, and said centrifugally actuated means being so proportioned relative to said kinetic energy that the total torque capacity of the clutch at any R. P. M. is substantially matched to said maximum engine torque plus the said kinetic energy.

9. In combination with an engine having a maximum torque output, a clutch comprising, driving and driven members, spring means for packing the clutch members together having a strength proportioned relative to the torque of the engine, whereby the clutch, when engaged by the spring means, has a torque capacity only sufficiently in excess of that necessary to transmit said maximum torque of the engine to take care of variables and insufficient to transmit said maximum torque of the engine plus kinetic energy of the engine and rotary clutch driving members, and centrifugally controlled means effective to increase the clutch packing pressure over that provided by the spring means upon rotation of the clutch, and calculated to increase and decrease the clutch packing pressure upon increase and decrease of the R. P. M. substantially proportionate to the increase and decrease of said kinetic energy, whereby at any given R. P. M. the torque capacity of the clutch is substantially matched to said maximum engine torque plus the torque of said kinetic energy.

10. In combination with an engine having a maximum torque output, a clutch comprising, driving and driven members, spring means for packing the members together, the strength of which is substantially matched with said maximum torque of the engine, and centrifugal weight means for packing the clutch members together, the effectiveness of which is substantially matched with the kinetic energy in the engine and driving clutch members.

11. In combination with an engine having a maximum torque output, a clutch comprising rotary driving and driven members, spring means for packing the clutch members together, having a strength proportioned relative to said maximum torque of the engine whereby the clutch when engaged by the spring means has a torque capacity which exceeds that required to transmit said maximum engine torque of the engine substantially only enough to take care of variables, and centrifugally actuated means for increasing the packing pressure over that provided by the spring means upon rotation of the engine and clutch driving members, said centrifugal means being calculated to provide such increased packing pressure as to give to the clutch the work absorbing ability of stalling said engine at substantially 4000 R. P. M. in approximately two seconds.

12. In combination with an engine having a maximum torque output, a clutch comprising rotary driving and driven members, spring means for packing the clutch members together, having a strength proportioned relative to said maximum torque of the engine whereby the clutch when engaged by the spring means has a torque capacity which exceeds that required to transmit said maximum engine torque of the engine substantially only enough to take care of variables, and centrifugally actuated means for increasing the packing pressure over that provided by the spring means upon rotation of the engine and clutch driving members, said centrifugal means being calculated to provide such increased packing pressure as to give to the clutch the work absorbing ability of stalling said engine at substantially 1000 R. P. M. in approximately .5 of a second.

13. A clutch comprising, a driving member, a driven member, a second driving member in the form of a pressure plate, spring means acting upon the pressure plate to pack the members together in engagement, a plurality of substantially radially extending levers, fulcrum means for each lever, each lever being connected to the pressure plate at a point radially separated from its fulcrum means, means for actuating the levers to withdraw the pressure plate from packing engagement, each lever having an outer end portion extending radially outwardly from the fulcrum and point of connection with the pressure plate, and axially, to provide an unbalanced centrifugal mass for acting upon the lever by centrifugal force to augment the packing pressure of the springs.

14. A clutch comprising, a driving member, a second driving member in the form of a pressure plate, a driven member positioned between the driving member and the pressure plate, spring means acting upon the pressure plate to pack the members together in engagement, a plurality of substantially radially disposed levers, fulcrum means for each lever, each lever being connected to the pressure plate at a point radially removed from its fulcrum means, means for rocking the levers to shift the pressure plate against the action of the springs to release the clutch, each lever having an outer end portion extending angularly radially outwardly and axially and having an enlargement on its end to provide an unbalanced centrifugal mass for actuating the lever by centrifugal force to augment the packing pressure of the springs.

15. A clutch comprising, a driving member, a second driving member in the form of a pressure plate, a driven member between the driving members, a cover plate attached at its forward portion to the first driving member and covering the pressure plate and driven member, spring means reacting against the cover plate and acting upon the pressure plate for packing the members into engagement, a plurality of substantially radially disposed levers each fulcrumed upon the cover plate, each lever being connected to the pressure plate at a point radially removed from its fulcrum, means for acting upon the inner ends of the levers to release the clutch against the action of the spring means, the cover plate having an aperture therein one for each lever, each lever having an outer end portion extending outwardly through an aperture in the cover plate and extending axially with respect to the fulcrum to provide an unbalanced centrifugal mass for acting upon the lever to augment the packing pressure of the spring means, said outer ends of the levers lying within a circle described by the outer edges of the cover plate when rotating and lying forwardly of the rear wall of the cover plate.

16. A clutch comprising, a driving member, a second driving member in the form of a pressure plate, a driven member between the driving members, a cover plate attached at its forward portion to the first driving member, and covering the pressure plate and driven member, spring means reacting against the cover plate and acting upon the pressure plate for packing the members into engagement, a plurality of substantially radially disposed levers each fulcrumed upon the cover plate, each lever being connected to the pressure plate at a point positioned radially outwardly of its fulcrum, means for acting upon the inner ends of the levers to withdraw the pressure plate against the action of the spring means, the cover plate having an aperture adjacent each lever, each lever having an outer end portion extending radially outwardly through the adjacent aperture and rearwardly of the fulcrum to provide an unbalanced centrifugal mass for acting upon the lever to augment the packing pressure of the spring means, said outer portion of each lever lying within the circle described by the outer edges of the cover plate when rotating and forwardly of the rearmost portion of the cover plate.

17. A clutch comprising, a driving member, a second driving member in the form of a pressure plate, a driven member positioned between the driving members, a cover plate connected to the first driving member at its forward portion and covering the driven member and the pressure plate, spring means reacting against the cover plate and acting upon the pressure plate to pack the driving and driven members into engagement, interengaging relatively slidable parts between the cover plate and the pressure plate whereby the cover plate drives the pressure plate, a plurality of clutch releasing levers, fulcrum means for the levers supported by the cover plate, each lever being connected to the pressure plate, the cover plate having an aperture therein one for each lever, the outer end of each lever having a portion extending through an aperture with said outer portion disposed axially removed from the fulcrum of the respective lever whereby to provide an unbalanced centrifugal mass for augmenting the spring packing pressure, said outer portions of the levers lying forwardly of the rearmost wall of the cover plate.

18. A clutch comprising, a driving member, a second driving member in the form of a pressure plate, a driven member positioned between the driving members, a cover plate connected to the first driving member and covering the driven member and pressure plate, spring means reacting against the cover plate and acting upon the pressure plate to pack the driving and driven members into engagement, said cover plate having apertures therein, bifurcated lugs on the pressure plate, each slidably fitting one of the apertures whereby the cover plate drives the pressure plate, clutch releasing levers, each lever being located in a bifurcated lug and being pivotally connected thereto, fulcrum means for each lever disposed radially inwardly of the pivot connection with the pressure plate, means for acting upon the inner ends of the levers to rock the same and withdraw the pressure plate against the action of the spring means, each lever having an outer end portion projecting through the adjacent aperture in the cover plate and each shaped to provide an unbalanced centrifugal mass disposed radially outwardly of the pivot connection with the pressure plate and axially removed therefrom.

19. A clutch comprising, a driving member, a second driving member in the form of a pressure plate, a driven member positioned between the driving members, a cover plate connected to the first driving member at its forward portion and covering the driven member and pressure plate, spring means reacting against the cover plate and acting upon the pressure plate to pack the driving and driven members into engagement, said cover plate having apertures therein, bifurcated lugs on the pressure plate, each slidably fitting one of the apertures whereby the cover plate drives the pressure plate, clutch releasing levers, each lever being located in a bifurcated lug and being pivotally connected thereto, fulcrum means for each lever disposed radially inwardly of the pivot connection with the pressure plate, means for acting upon the inner ends of the levers to rock the same and withdraw the pressure plate against the action of the spring means, each lever having an outer end portion projecting through the adjacent aperture in the cover plate and each shaped to provide an unbalanced centrifugal mass disposed radially outwardly of the pivot connection with the pressure plate and axially removed therefrom, said outer end of each lever lying within the largest circle described by the cover plate when rotating and forwardly of the rearmost portion of the cover plate.

20. A clutch for use within a housing wherein close clearances between the clutch and housing are present, comprising a driving member, a second driving member in the form of a pressure plate, a driven member between the driving members, a cover plate attached at its forward portion to the first mentioned driving member and covering the driven member and pressure plate, spring means reacting against the rear portion of the cover plate and acting upon the pressure plate for packing the driving and driven members into engagement, clutch releasing levers fulcrumed on the cover plate and connected to the pressure plate, means for acting upon the inner ends of the levers to withdraw the pressure plate and release the clutch, the cover plate having an aperture adjacent each lever and each lever having an outer end portion extending through the adjacent aperture in the cover plate and each shaped to provide an unbalanced centrifugal mass disposed radially outwardly and axially removed from the fulcrum point of each lever, said unbalanced centrifugal masses lying relatively close to the outer wall of the cover plate, within a circle described by the outer edges of the cover plate when rotating, and forwardly of the rearmost portion of the cover plate.

ERNEST E. WEMP.